United States Patent [19]

Ozaki

[11] Patent Number: 4,766,486
[45] Date of Patent: Aug. 23, 1988

[54] CARRIER CHROMINANCE SIGNAL PROCESSING CIRCUIT

[75] Inventor: Hidetoshi Ozaki, Tokyo, Japan

[73] Assignee: Victor Company of Japan, Yokohama, Japan

[21] Appl. No.: 906,402

[22] Filed: Sep. 9, 1986

[30] Foreign Application Priority Data

Sep. 9, 1985 [JP] Japan .................................. 60-198959
Sep. 9, 1985 [JP] Japan .................................. 60-198960

[51] Int. Cl.$^4$ ............................................. H04N 9/87
[52] U.S. Cl. ........................................ 358/40; 358/31; 358/329
[58] Field of Search .................... 358/31, 36, 327, 328, 358/329, 167, 40

[56] References Cited

U.S. PATENT DOCUMENTS

| | | | |
|---|---|---|---|
| 4,263,612 | 4/1981 | Gibson et al. | 358/31 |
| 4,513,311 | 4/1985 | Hirai et al. | 358/329 |
| 4,558,353 | 12/1985 | Hirota | 358/36 |
| 4,636,863 | 1/1987 | Kaizaki et al. | 358/36 |
| 4,677,486 | 6/1987 | Noda et al. | 358/36 |

FOREIGN PATENT DOCUMENTS

| | | |
|---|---|---|
| 57-160287 | 10/1982 | Japan . |
| 59-94983 | 5/1984 | Japan . |
| 60-69997 | 4/1985 | Japan . |
| 61-126890 | 6/1986 | Japan . |
| 2124852 | 2/1984 | United Kingdom . |

*Primary Examiner*—Donald McElheny, Jr.
*Attorney, Agent, or Firm*—Lowe, Price, LeBlanc, Becker & Shur

[57] ABSTRACT

A carrier chrominance signal processing circuit for use in an apparatus such as a video tape recorder is based upon a feedback comb filter for enhancing the S/N ratio of the playback carrier chrominance signal, and circuits for detecting vertical coherence in a playback luminance signal and carrier chrominance signal respectively. Loop feedback within the feedback comb filter is controlled in accordance with a plurality of specific combinations of conditions of vertical coherence and vertical non-coherence of the carrier chrominance signal and luminance signal, such as to minimize vertical color blurring being produced by the operation of the feedback comb filter while effectively suppressing noise components in the playback carrier chrominance signal.

12 Claims, 5 Drawing Sheets

CARRIER CHROMINANCE SIGNAL PROCESSING CIRCUIT

BACKGROUND OF THE INVENTION

The present invention relates to a carrier chrominance signal processing circuit for a video signal playback apparatus such as a video tape recorder, and in particular to a carrier chrominance signal processing circuit whereby the level of noise in a playback carrier chrominance signal is reduced by employing a feedback comb filter.

The use of a comb filter for reducing noise components in a playback carrier chrominance signal of a video tape recorder, particularly noise resulting from crosstalk generated by the record/playback process, is well known. Such a comb filter is based upon a delay circuit which produces a delay equal to an integral number of horizontal scanning intervals. In its simplest form such a comb filter consists of a single delay circuit which is coupled to receive the playback carrier chrominance signal, and means for combining the output signal from the delay circuit with the input carrier chrominance signal to thereby provide a filtered output signal. However improved filter performance can be achieved by implementing feedback of part of the latter output signal to the input of the filter, such an arrangement being referred to in the following as a feedback comb filter.

In the following, the designation "vertical coherence" will be applied to a condition of a carrier chrominance signal or a luminance signal in which the data contents of two successive horizontal scanning intervals of the carrier chrominance signal or the luminance signal would produce a substantially vertically aligned pattern on a CRT, when displayed. For example vertical coherence would be exhibited by all of successive pairs of scanning lines of a carrier chrominance signal if the data therein will result only in one or more vertical color lines being displayed. Similarly, vertical coherence would be exhibited by successive pairs of luminance signal horizontal scanning intervals if the data therein will result only in one or more vertical dark or light lines being displayed. Similarly, the designation "vertical non-coherence" will be applied to a condition of a carrier chrominance signal or a luminance signal in which the data contents of two successive horizontal scanning intervals of the carrier chrominance signal or the luminance signal would produce a vertically non-aligned pattern on a CRT after having been processed to be displayed. For example vertical non-coherence would be exhibited by a pair of successive horizontal scanning lines in a carrier chrominance signal if the data therein will result in one or more horizontal color lines or line segments being displayed by only one of these scanning lines, or in the two scanning lines respectively producing displayed line segments which are not mutually vertically aligned.

In practice, the descriptions "vertical coherence" and "vertical non-coherence" are not used in an absolute sense, but are of variable degree and can be judged with reference to a specific threshold level, as described hereinafter.

It has been found that the requirements for optimizing the degree of feedback within a feedback comb filter used for a playback carrier chrominance signal in a video playback apparatus (i.e. such as to minimize the amount of blurring in the vertical direction of the resultant displayed image) will vary, depending upon the current conditions of vertical coherence and vertical non-coherence exhibited by the playback carrier chrominance signal and luminance signal. More specifically, although the use of a feedback comb filter provides a greater improvement of the signal/noise ratio of a playback carrier chrominance signal than does a non-feedback comb filter, the feedback comb filter has the disadvantage of producing vertical blurring of the displayed image under certain conditions. In general, if both the luminance signal and carrier chrominance signal are substantially vertically non-coherent, as defined hereinabove, then the use of a feedback comb filter to process the playback carrier chrominance signal will result in vertical blurring of the displayed image, with the amount of blurring being decreased if the feedback factor of the comb filter is reduced. Conversely, if both the luminance signal and carrier chrominance signal are substantially vertically coherent then such vertical blurring will not be produced by the use of a feedback comb filter. For this reason, it has been proposed to continuously monitor the degree of vertical coherence of the luminance signal, and to control the degree of feedback in the feedback factor in accordance with that vertical coherence. FIG. 1 is a general block diagram of a system known in the prior art whereby the feedback factor of a feedback comb filter is varied in accordance with the amount of vertical coherence of the playback luminance signal, the system being utilized in a video tape recorder. In FIG. 1, video data from a magnetic tape 1 is produced as a video signal from a playback head 2. This signal is transferred through a preamplifier 3 to a high-pass filter (HPF) 4, which separates the luminance signal from the video signal. The luminance signal is transferred through a playback luminance signal processing circuit 5 to a Y vertical coherence signal detection circuit 6 (where "Y" has the generally accepted significance in color television technology of "luminance signal", and "C" as used hereinafter has the generally accepted significance of "chrominance signal"), which produces a detection signal indicating vertical non-coherence.

The output signal from preamplifier 2 is also supplied to a low-pass filter LPF 7, which separates the chrominance carrier signal. The chrominance carrier signal is supplied to a chrominance signal processing circuit 8, which performs processing (i.e. up-conversion) to produce a 3.58 MHz carrier chrominance signal (in the NTSC system). The processed carrier chrominance signal from chrominance signal processing circuit 8 is then supplied to a noise reduction circuit 9, which is based on a feedback comb filter. In the the feedback comb filter noise reduction circuit 9, the degree of feedback is controlled by a control signal in accordance with an output signal from the Y vertical coherence signal detection circuit 6, which detects the degree of vertical coherence (as defined hereinabove) of the luminance signal in successive pairs of horizontal scanning lines. Variation of the amount of feedback in the feedback comb filter of noise reduction circuit 9 is performed such as to lower the levels of noise components in the carrier chrominance signal. Following this noise reduction processing, the carrier chrominance signal is combined with the luminance signal from the playback luminance signal processing circuit 5, in a mixing circuit 10, and the resultant composite video signal is applied to an output terminal 11.

The assignee of the present invention has previously proposed a carrier chrominance signal processing circuit, basically applicable to the system shown in FIG. 1, in which the degree of feedback of the feedback comb filter is controlled in accordance with the status of vertical coherence of the playback luminance signal. This circuit is described in Japanese patent application No. 59-247538, which was published on June 14, 1986 with publication No. 61-126890 and is shown in FIG. 2, and corresponds to the Y vertical coherence signal detection circuit 6 and the noise reduction circuit 9 shown in FIG. 1. In FIG. 2 the 3.58 MHz carrier chrominance signal designated as PB C is applied to input terminal 12, for example from the chrominance signal processing circuit 8 in FIG. 1, and has the noise components thereof reduced by a feedback comb filter. This is made up of an adder/subtractor circuit 13, a 1 H delay circuit (1H DLY) 14 (where H denotes the duration of one horizontal scanning interval), an adder circuit 15, a limiter 17, and a feedback factor control circuit 16 which can comprise for example a voltage-controlled amplifier. The output signal from this feedback comb filter circuit is supplied to an output terminal 18. The luminance signal designated as PB Y which is applied to terminal 19, e.g. from luminance signal processing circuit 5 in FIG. 1, is supplied to a Y vertical coherence detection circuit 23, which is made up of an adder/subtractor 21, a detector 22 and a 1H delay line 20. The Y vertical coherence detection circuit produces a detection signal indicating the presence or absence of vertical coherence, and this signal is supplied to the feedback factor control circuit 16 to control the feedback factor of the feedback comb filter, which is designated in the following as K. Specifically, when the luminance signal is detected as having vertical coherence, then the feedback factor K of the feedback comb filter is controlled, by the detection signal from detection circuit 23 acting on the feedback factor control circuit 16, to be a maximum. If the luminance signal is detected as being non-coherent, then the feedback factor K is controlled to be lower than the value of K which is produced when vertical coherence of the luminance signal is detected. This lower value may be zero, in which case the feedback factor will effectively be caused to function as a non-feedback comb filter. The limiting level set by the limiting factor S of limiter 17 ( where S<<1) is established such that the output signal from limiter 17 is held to within 10% of the maximum input signal level thereto. This output signal is then multiplied by the feedback factor K that is determined by the feedback factor control circuit 16, so that the effective feedback factor of the feedback comb filter becomes K.S. The amplitude of the feedback signal is therefore substantially smaller than in the case of prior art circuits of this type. The feedback signal is then subtracted from the carrier chrominance signal in adder/subtractor 13, and the resultant output signal is applied to terminal 18.

As a result of the feedback factor of the feedback loop in this circuit being reduced from K to K.S, the cut-off frequency of the circuit is increased. Thus, the filter circuit has an improved capability for following rapidly occurring signal variations.

Although adder/subtractor 13 is shown to operate as a subtractor in FIG. 2, it actually functions as an adder, because there is a phase difference of 180° between its input signals.

With the circuit of FIG. 2, a reduction of color blurring in the vertical direction, when the luminance signal and the carrier chrominance signal are not vertically coherent, is attained due to the reduction in the feedback factor of the feedback comb filter. However under some circumstances, in particular when the input signal contains noise components which exceed the limiter level of limiter 17, the circuit cannot effectively function to limit color blurring in the vertical direction or to increase the S/N ratio.

SUMMARY OF THE INVENTION

A carrier chrominance processing circuit according to the present invention serves to increase the signal/noise ratio of a carrier chrominance signal which is derived together with a luminance signal by a playack process in video signal reproduction apparatus such as a video tape recorder, and essentially comprises a feedback comb filter, means for detecting vertical coherence of a carrier chrominance signal and means for detecting vertical coherence of a luminance signal, and control means for controlling feedback within the comb filter in accordance with a plurality of different combinations of conditions of vertical coherence and non-coherence of the carrier chrominance signal and the luminance signal.

More particularly, a carrier chrominance signal processing circuit according to the present invention comprises a carrier chrominance signal processing circuit for processing a carrier chrominance signal of a television video signal which is constituted by the carrier chrominance signal and a luminance signal, with such a carrier chrominance processing circuit comprising:

a feedback comb filter formed of a delay circuit for producing a delay which is equal to n.H, where n equals either 1 or 2 and where H is the duration of a horizontal scanning interval of the television video signal, a first factor control circuit coupled to an input of the delay circuit, a second factor control circuit coupled to an output of the delay circuit, a signal combining circuit for combining the carrier chrominance signal to be processed with an output signal from the second factor control circuit, with an output signal from the signal combining circuit being applied through the first factor control circuit to the delay circuit, the first factor control circuit being operable to determine an attenuation or amplification factor for signal transfer from the signal combining circuit to the delay circuit input and the second factor control circuit being operable to determine an attenuation or amplification factor for signal transfer from the delay circuit to the signal combining circuit input;

a Y vertical coherence detection circuit for detecting vertical coherence of the luminance signal and producing a detection signal indicative thereof;

a C vertical coherence detection circuit for detecting vertical coherence of the carrier chrominarce signal and producing a detection signal indicative thereof, and;

a control circuit for controlling the factors determined by the first and second factor circuits respectively, in accordance with the detection signals produced from the Y vertical coherence detection circuit and C vertical coherence detection circuit.

DESCRIPTION OF THE PREFERRED EMBODIMENTS

Figure 1:
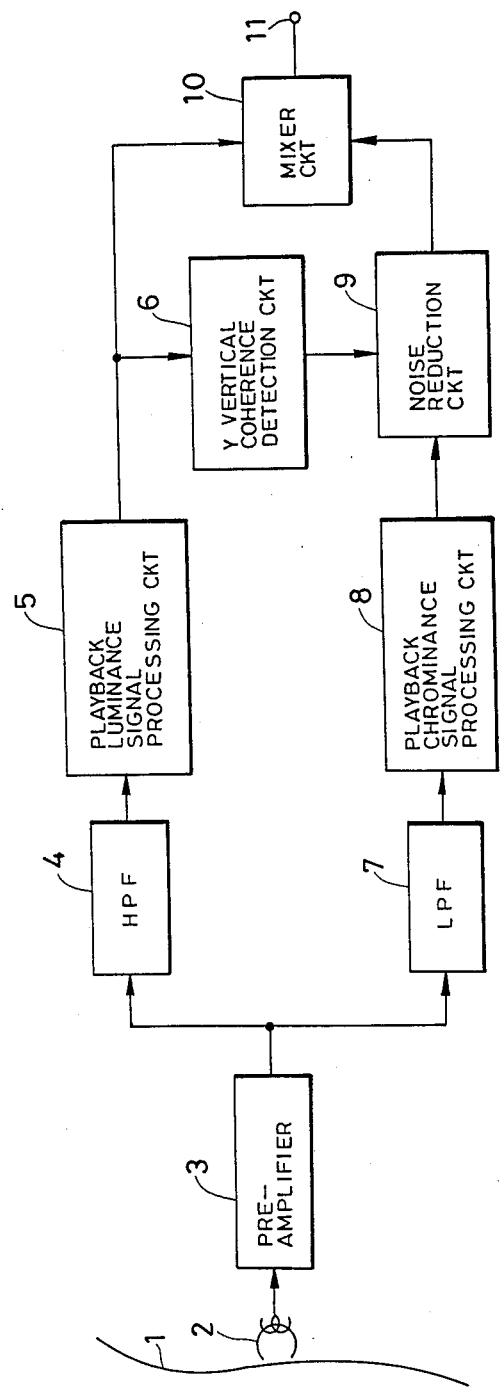
FIG. 1 is a general block diagram of a playback signal processing system for a video tape recorder, including a carrier chrominance signal noise reduction circuit.
Figure 2:
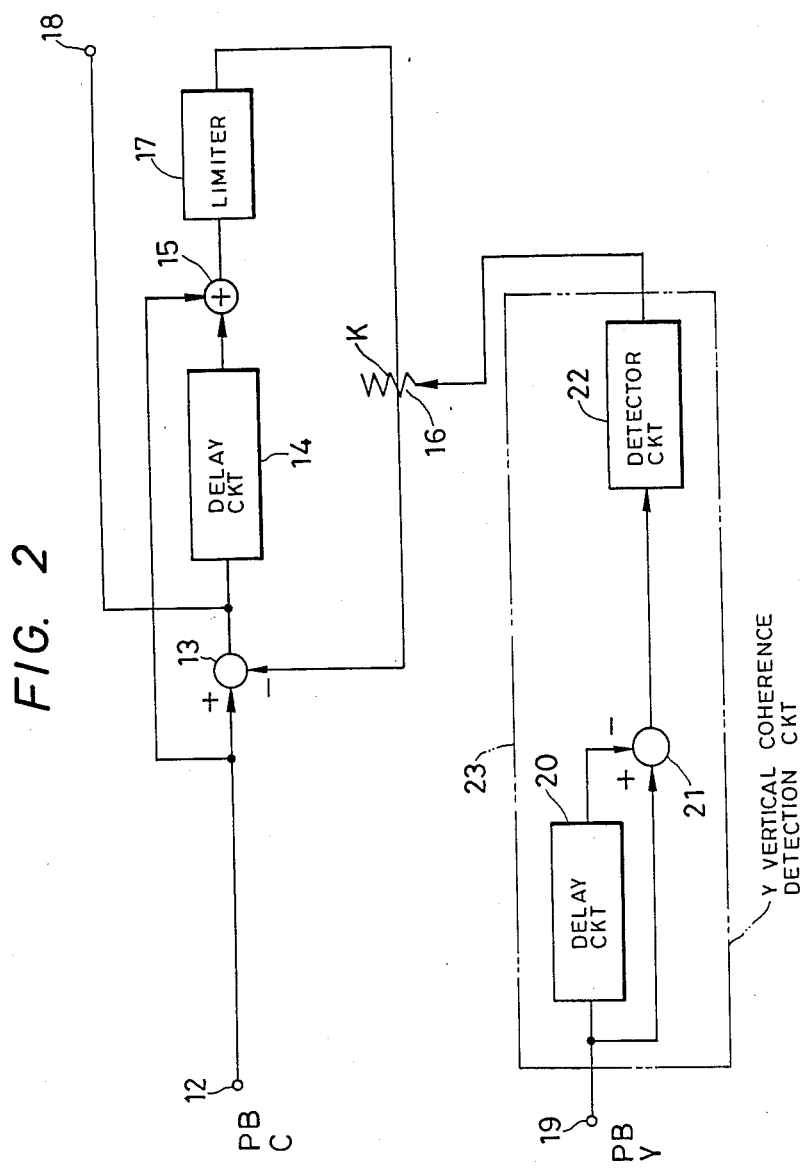
FIG. 2 is a circuit block diagram of a carrier chrominance signal processing circuit employing selective control of the feedback factor of a feedback comb filter, previously proposed by the present applicant.
Figure 3:
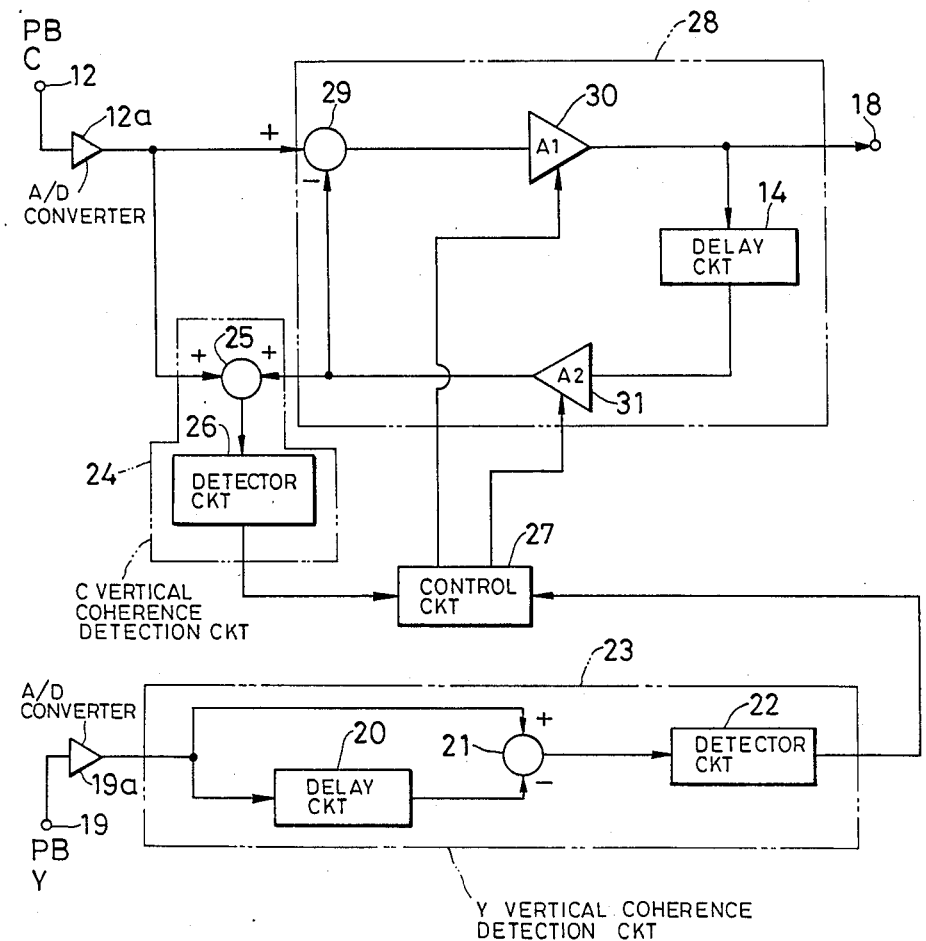
FIG. 3 is a circuit block diagram of an embodiment of a carrier chrominance signal processing circuit according to the present invention.

FIG. 3 is a block system diagram of a first embodiment of the present invention. Components which correspond to those of the system in FIG. 2 are indicated by corresponding reference numerals, and further description will be omitted. In FIG. 3, a playback carrier chrominance signal designated as PB C and applied to input terminal 12 is inputed to an analog/digital (A/D) converter 12a, to be periodically sampled and converted into a digital signal comprising successive sets of bits, with each set of bits representing a numeric value corresponding to the amplitude of a sample. The number of bits in each of these sets will be designated as "n" in the following. The luminance signal PB Y is similarly converted into a digital signal, by an A/D converter 19a. The digital carrier chrominance signal is then inputed to a feedback comb filter 28 and also to a C vertical coherence detection circuit 24 which is made up of an adder circuit 25 and a detector 26. Circuit 24 serves to detect the presence or absence of vertical coherence of the carrier chrominance signal which is supplied to terminal 12, and supplies a corresponding detection signal to a control circuit 27. The digital luminance signal from A/D converter 19a is inputed to a Y vertical coherence detection circuit 23. which produces a detection signal indicating the presence or absence of vertical coherence of the luminance signal, and this detection signal is also applied to the control circuit 27. The detector circuits 22 and 26 each compare the input signal applied thereto with respective specific threshold levels. In this embodiment, the detection signal produced from each of detector circuits 22 and 26 is a two-state signal, (i.e. a single bit) whose state indicates the presence or absence of vertical coherence.

Numeral 28 denotes a feedback comb filter which is made up of a signal combiner 29, a feedback factor control circuit 30 which determines the value of a factor A1, a 1H delay circuit 14, and a factor circuit 31 which determines the value of a factor A2. Factor circuit 30 is connected between the output of signal combiner 29 and the input of delay circuit 14, and factor A1 is a controllable degree of attenuation or amplification of signals transferred between that signal combiner output and delay circuit input. Factor circuit 31 is connected between the output of delay circuit 14 and one input of the signal combiner 29, and factor A2 is a controllable degree of attenuation or amplification of signals transferred between that delay circuit output and signal combiner input. The combination of these factors A1 and A2 thereby determines the effective loop feedback factor of the feedback comb filter 28. Variable control of the factors A1 and A2, determined by factor circuits 30 and 31 respectively, is performed by control signals produced from control circuit 27.

Variable adjustment of the factors A1 and A2 to predetermined values is performed by control circuit 27 in accordance with four combinations of conditions, as illustrated in Table 1 below. This control by control circuit 27 is implemented in accordance with combinations of detection signals from the vertical coherence detection circuits 23 and 24 respectively indicating the presence or absence of Y vertical coherence and C vertical coherence.

TABLE 1

|  | Y vertical coherence | C vertical coherence | $A_1$ | $A_2$ |
|---|---|---|---|---|
| First condition | Absent | Absent | 4 | 0 |
| Second condition | Absent | Present | 2 | 0.5 |
| Third condition | Present | Absent | 2 | 0.5 |
| Fourth condition | Present | Present | 1 | 0.75 |

Control circuit 27 judges each of the four conditions in the above table. If it is judged that the first condition exists, i.e. that both the luminance and chrominance signals do not have vertical coherence, then factor A1 is made equal to 4, and A2 is made equal to 0. If it is judged that the second condition exists, i.e. that the luminance signal does not have vertical coherence but the chrominance signal has vertical coherence, then factor A1 is made equal to 2 and A2 is made equal to 0.5. If it is judged that the third condition exists, i.e. that the luminance signal has vertical coherence but the chrominance signal does not, then factor A1 is made equal to 2 and A2 is made equal to 0.5. If it is judged that the fourth condition exists, i.e. that both the luminance and the chrominance signals have vertical coherence, then factor A1 is made equal to 1 and A2 is made equal to 0.75.

As a result, if for example both the luminance and the chrominance signals do not have vertical coherence, i.e. the first condition described above exists, then since A1 is set equal to 1 and A2 equal to 0, the effective feedback factor of the comb filter circuit 28 is brought to zero, i.e. no signal is fed through the path extending from the input of delay circuit 14 to the output of factor circuit 31. As a result, vertical color blurring caused by feedback operation of the comb filter is eliminated under this combination of conditions of the carrier chrominance signal and luminance signal.

In the case of conditions 2 through 4, since variable setting of the factors A1 and A2 of factor circuits 30 and 31 respectively is performed, a more complete degree of removal of vertical color blurring is attained than in the case of the circuit shown in FIG. 2 which was previously proposed by the assignee of the present invention.

In the above embodiment, detector 22 produces a two-state (1-bit) output to indicate either vertical coherence or vertical non-coherence of the luminance signal, while a similar function is performed by detector 26 for the carrier chrominance signal. However as stated hereinabove, various levels of vertical coherence can be detected, i.e. varying degrees of correspondence between the luminance signal during two successive horizontal scanning intervals, or the carrier chrominance signal during two successive horizontal scanning intervals. For this reason, it would be equally possible to configure each of detectors 22 and 26 such as to produce detection output signals which represent a plurality of degrees of vertical coherence, for example to arrange that each of detector circuits 22 and 26 produces output signals which can vary in 8 steps which respectively indicate varying degrees of vertical coherence.

In the case of the circuit arrangements illustrated in FIGS. 3 and 4 (the latter being described hereinafter), the factors A1 and A2 should be selected to satisfy the following equation:

$$A1/(1-A2) = \text{constant}$$

for any condition of the luminance and chrominance signals, in order that the effective gain of the carrier chrominance signal is maintained constant.

In addition, in each of the detector circuits 22 and 26 in the embodiment of FIG. 3, judgement of vertical coherence or non-coherence is performed on the basis of a fixed reference value, i.e. a threshold value. However it has been found that improved performance is obtained if this threshold value is varied in accordance with the state of vertical coherence of the luminance signal, as detected by detection circuit 23. A second embodiment of the present invention is shown in FIG. 4, to implement this feature. As shown, the detection output from detector circuit 22 is applied to detector circuit 26 in the C vertical coherence detection circuit 24, to control the threshold level of detector circuit 26. Specifically, when it is detected that the luminance signal does not have vertical coherence, the threshold level of detector circuit 26 is controlled by the output signal from detector circuit 22 to be lower than the threshold level for the case in which there is vertical coherence of the luminance signal. This results in improved detection of vertical coherence of the carrier chrominance signal when the S/N ratio of the carrier chrominance signal is poor, enabling error-free operation of the embodiment of FIG. 4 to be assured even in the presence of a high level of signal noise.

Figure 4:
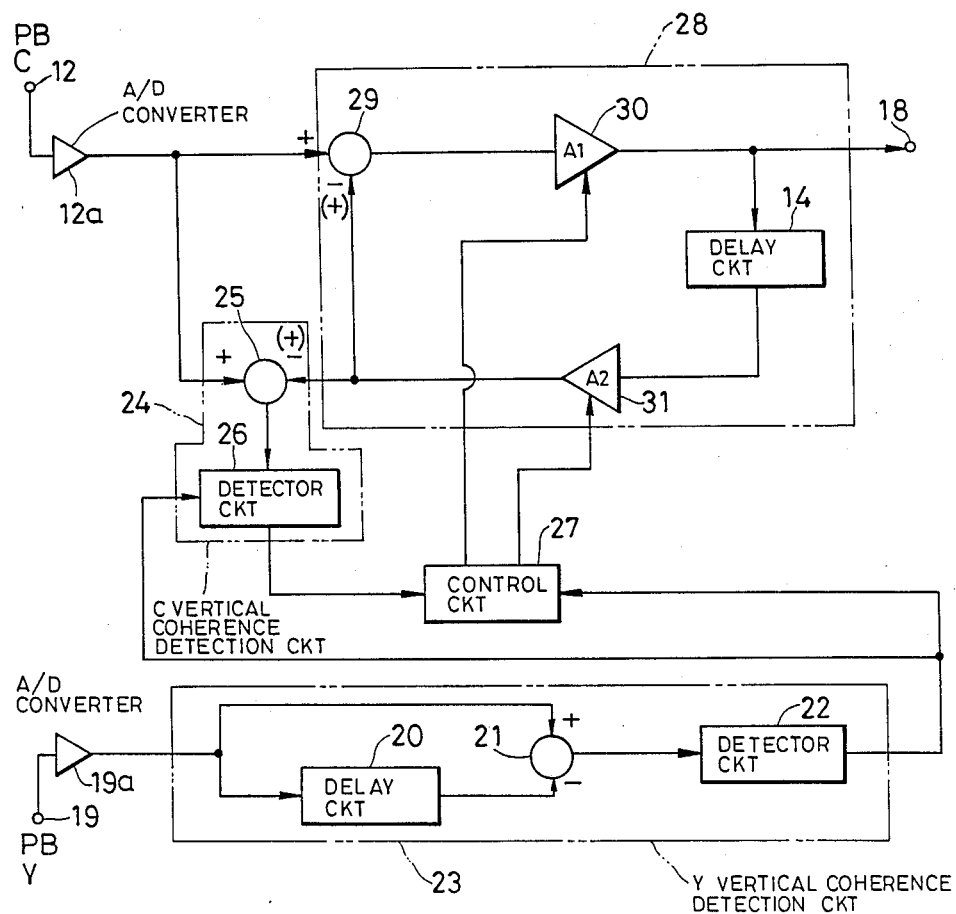
FIG. 4 is a circuit block diagram of a second embodiment of a carrier chrominance signal processing circuit according to the present invention, incorporating variable control of vertical coherence detection threshold level.
Figure 5:
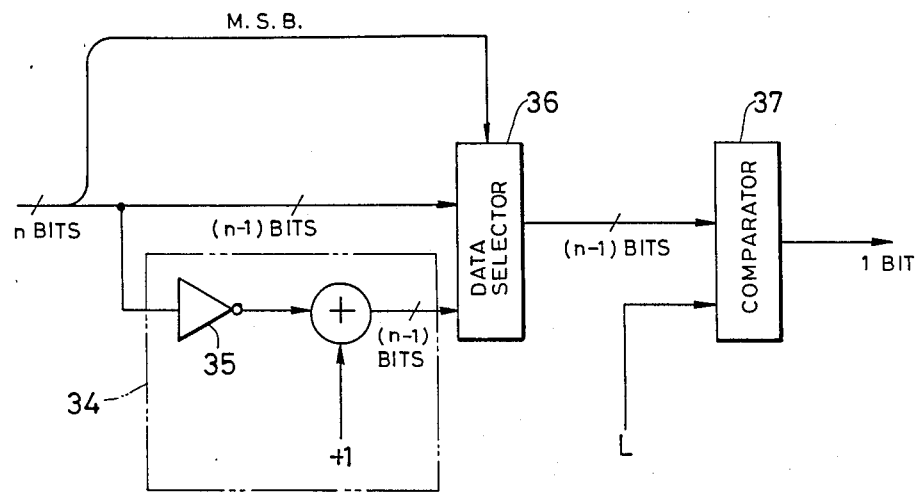
FIG. 5 is a circuit block diagram of an example of a digital type of detector circuit for use in a luminance or chrominance vertical coherence detection circuit in FIGS. 3 or 4.

FIG. 5 shows an example of a circuit for detector circuit 22 or 26 in the embodiments of FIGS. 3 and 4. The circuit consists of a data selector 36, a multiplier circuit 34 which multiplies input data applied thereto by −1, to produce the absolute value of the input data when the data is negative, and a comparator 37. Each of successive sets of n data bits, each representing a degree of vertical coherence between a portion of one horizontal scanning line and the corresponding portion of the immediately succeeding horizontal scanning line, produced from signal combiner 21 in the case of Y vertical coherence detection circuit 23 and from signal combiner 25 in the case of C vertical coherence detection circuit 24, is supplied to this circuit in 2's complement form. The most significant bit (MSB), which represents the plus/minus sign of the data, is applied to a control input of the data selector 36. Data selector 36 thereby selects either the lower-significance (n−1) bits of the data or those (n−1) bits multiplied by −1, to be outputed therefrom, and supplied to the comparator 37. These selected (n−1) bits, which represent the absolute value of the input data, are then compared with data representing a threshold value L, in comparator 37, and a resulting 1-bit output is produced, representing either vertical coherence or vertical non-coherence.

With the first embodiment of the invention described above, the value of the threshold level L would be fixed, while in the case of the second embodiment of FIG. 4, the value of L for the detector circuit 26 would be varied in accordance with the status of the output from Y vertical coherence detection circuit 23. Means for implementing such control of the value of L can be easily envisaged, and further description will be omitted.

Figure 6:
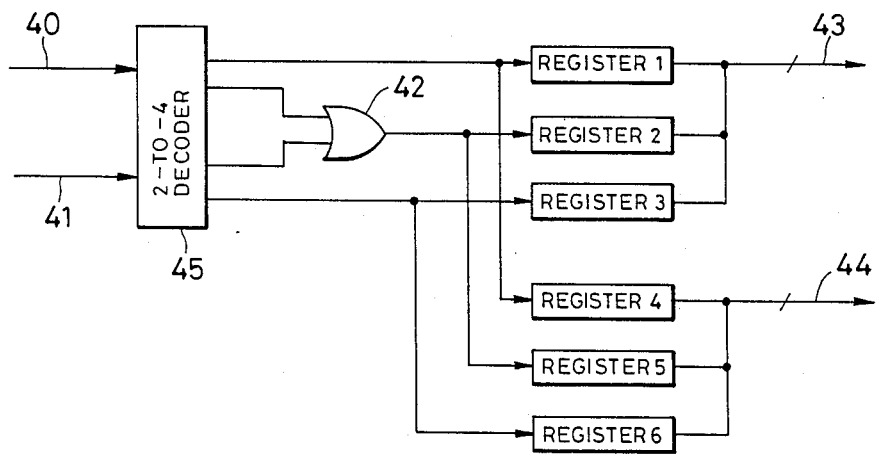
FIG. 6 is a circuit block diagram of an example of a control circuit for the circuit of FIGS. 3 or 4.

FIG. 6 is a circuit block diagram of an example of control circuit 27 in the embodiments of FIGS. 3 and 4. The output signals from detector circuits 26 and 22 are applied to a 2-to-4 decoder 45 from input lines 40 and 41 respectively. The outputs from 2-to-4 decoder 45 are applied to output control terminals of registers 1 through 6, with two of the decoder outputs being passed through an OR gate 42, as shown. The register contents are applied through lines 43 and 44 to control the factor circuits 30 and 31 respectively, and hence factors A1 and A2 respectively, in the embodiments of FIGS. 3 and 4. The weighting values for the register outputs with respect to control of the factors A1 and A2 determined by factor circuits 30 and 31 respectively are as follows:

Register 1: 4
Register 2: 2
Register 3: 1
Register 4: 0
Register 5: 0.5
Register 6: 0.75

The present invention has been described in the above with reference to a VTR playback system. However it should be noted that the invention is not limited to such an application. It should also be noted that the frequency of the carrier chrominance signal is not limited to 3.58 MHz (i.e. the NTSC standard).

Furthermore, the use of a delay value of one horizontal scanning interval (1H) for delay circuit 14 applies to the case of the NTSC standard. In the case of a circuit for the PAL standard, it would be necessary to use 2H delay circuits, i.e. with the delay circuit providing a delay which is equivalent to two horizontal scanning intervals. In general, the delay value is n.H, where n=1 for the NTSC standard, and n=2 for the PAL standard.

With a carrier chrominance signal processing circuit according to the present invention, variable control of factors established respectively by two factor circuits provided in a feedback comb filter, which in combination determine the effective feedback factor of the comb filter, is performed by detection signals which are respectively produced from a Y vertical coherence detection circuit and a C vertical coherence detection circuit. As a result, effective elimination of vertical color blurring is attained, both for the case in which the carrier chrominance signal and the luminance signal have vertical coherence and the cases in which one or both of these does not have vertical coherence. The reduction of color blurring is substantially greater than that attained by the circuit previously proposed by the assignee of the present invention, described hereinabove, which has the same objectives. This is especially true when a high level of noise is inputed to the circuit, which would exceed the limiter level in the circuit previously proposed by the present applicant. With the present circuit, effective elimination of color blurring can be attained even with a high level of input noise, by suitable adjustment of the feedback factors. Furthermore, due to the fact that fine control is implemented based on combinations of conditions of presence or absence of vertical coherence of the luminance signal and the carrier chrominance signal, more effective noise suppression is attained, resulting in improved S/N ratio. The invention also has the further advantage that the degree of noise reduction can be increased as required by setting the feedback factors determined by the factor circuits to sufficiently high values.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A carrier chrominance signal processing circuit for processing a carrier chrominance signal of a television video signal constituted by said carrier chrominance signal and a luminance signal, said processing circuit comprising:
   a feedback type of filter coupled to receive said carrier chrominance signal, for reducing noise components contained in said carrier chrominance signal;
   coherence detection means for detecting conditions of vertical coherence and vertical non-coherence of said carrier chrominance signal and said luminance signal and for producing detection signals indicative of said conditions, and;
   control means responsive to said detection signals for controlling a degree of feedback within said filter in accordance with respective ones of a plurality of combinations of said conditions of vertical coherence and non-coherence of said luminance signal and said carrier chrominance signal.

2. A carrier chrominance signal processing circuit for processing a carrier chrominance signal of a television video signal constituted by said carrier chrominance signal and a luminance signal, said processing circuit comprising:
   a feedback type of filter coupled to receive said carrier chrominance signal, for reducing noise components contained in said carrier chrominance signal;
   coherence detection means for detecting conditions of vertical coherence and vertical non-coherence of said carrier chrominance signal and said luminance signal and producing detection signals indicative of said conditions; and
   control means responsive to said detection signals for controlling a degree of feedback within said filter in accordance with respective ones of a plurality of combinations of said conditions of vertical coherence and non-coherence of said luminance signal and said carrier chrominance signal;
   said filter comprising a feedback comb filter formed of a delay circuit for producing a delay which is equal to n.H where n equals either 1 or 2 and where H is the duration of a horizontal scanning interval of said television video signal, a first factor control circuit coupled to an input of said delay circuit, a second factor control circuit coupled to an output of said delay circuit, a signal combining circuit for combining said carrier chrominance signal to be processed with an output signal from said second factor control circuit, with an output signal from said signal combining circuit being applied through said first factor control circuit to said delay circuit, said first factor control circuit being operable to determine an attenuation or amplification factor for signal transfer from said signal combining circuit to said delay circuit input and said second factor control circuit being operable to determine an attenuation or amplification factor for signal transfer from said delay circuit to said signal combining circuit input;
   and said coherence detection means comprising:
   a Y vertical coherence detection circuit for detecting vertical coherence of said luminance signal and producing a detection signal indicative thereof;
   a C vertical coherence detection circuit for detecting vertical coherence of said carrier chrominance signal and producing a detection signal indicative thereof;
   and said control means comprising:
   a control circuit for controlling said factors determined by said first and second factor circuits respectively, in accordance with said detection signals produced from said Y vertical coherence detection circuit and C vertical coherence detection circuit.

3. A carrier chrominance signal processing circuit according to claim 2, in which said each of said detection signals from said Y vertical coherence detection circuit and C vertical coherence detection circuit vary in a plurality of steps for indicating a plurality of degrees of vertical coherence, and in which said control circuit performs stepwise control of said first and second factor circuits respectively in response to said detection signals.

4. A carrier chrominance signal according to claim 2, in which said control circuit performs variable setting of predetermined values for said factors set respectively by said first and second factor circuits, with said variable setting being performed in accordance with four combinations of conditions of presence and absence of vertical coherence of said luminance signal and said carrier chrominance signal, as indicated by said detection signals from said Y vertical coherence detection circuit and C vertical coherence detection circuit.

5. A carrier chrominance signal processing circuit according to claim 2, in which said C vertical coherence detection circuit comprises means for comparing data representing a degree of vertical coherence between corresponding portions of two successive horizontal scanning lines of said television video signal with a specific threshold level.

6. A carrier chrominance signal processing circuit according to claim 5, in which said threshold level is controlled in accordance with said detection signal from said Y vertical coherence detection circuit.

7. A carrier chrominance signal processing circuit for processing a carrier chrominance signal of a television video signal constituted by said carrier chrominance signal and a luminance signal, said processing circuit comprising:
   a feedback type of filter coupled to receive said carrier chrominance signal, for reducing noise components contained in said carrier chrominance signal;
   first coherence detection means for detecting a condition of vertical coherence of said carrier chrominance signal and producing a first detection signal indicative thereof, and second coherence detection means for detecting a condition of vertical coherence of said luminance signal and producing a second detection signal indicative thereof; and control means coupled to receive said first and second detection signals and responsive to a combination of said first and second detection signals for controlling feedback within said filter.

8. A carrier chrominance signal processing circuit according to claim 7, in which said filter comprises:

a feedback comb filter formed of a delay circuit for producing a delay which is equal to n.H, where n equals either 1 or 2 and where H is the duration of a horizontal scanning interval of said television video signal, a first factor control circuit coupled to an input of said delay circuit, a second factor control circuit coupled to an output of said delay circuit, a signal combining circuit for combining said carrier chrominance signal to be processed with an output signal from said second factor contol circuit, with an output signal from said signal combining circuit being applied through said first factor control circuit to said delay circuit, said first factor control circuit being operable to determine an attenuation or amplificatin factor for signal transfer from said signal combining circuit to said delay circuit input and said second factor control circuit being operable to determine an attenuation or amplification factor for signal transfer from said delay circuit to said signal combining circuit input;

said first coherence detection means comprising a Y vertical coherence detection circuit for detecting vertical coherence of said luminance signal to produce said first detection signal;

said second coherence detection means comprising a C vertical coherence detectin circuit for detecting vertical coherence of said carrier chrominance signal to produce said second detection signal; and said control means comprising a control circuit for controlling said factors determined by said first and second factor circuits respectively, in response to said first and second detection signals.

9. A carrier chrominance signal processing circuit according to claim 8, in which said each of said first and second detection signals varies in a plurality of steps for indicating a plurality of degrees of vertical coherence, and in which said control circuit performs stepwise contorl of said first and second factor circuits respectively in response to said first and second detection signals.

10. A carrier chrominance signal according to claim 8, in which said control circuit performs variable setting of predetermined values for said factors set respectively by said first and second factor circuits, with said variable setting being performed in accordance with four combinations of conditions of presence and absence of vertical coherence of said luminance signal and said carrier chrominance signal, as indicated by respective combinations of said first and second detection signals.

11. A carrier chrominance signal processing circuit according to claim 8, in which said C vertical coherence detection circuit comprises means for comparing data representing a degree of vertical coherence between corresponding poritons of two successive horizontal scanning lines of said television video signal with a specific threshold level.

12. A carrier chrominance signal processing circuit according to claim 11, in which said threshold level is controlled in accordance with said detection signal from said Y vertical coherence detection circuit.

* * * * *